United States Patent
Heil

(10) Patent No.: US 6,788,313 B1
(45) Date of Patent: Sep. 7, 2004

(54) METHOD AND APPARATUS FOR PROVIDING ON LINE HELP FOR CUSTOM APPLICATION INTERFACES

(75) Inventor: Scott Martin Heil, Carmel, IN (US)

(73) Assignee: International Business Machines Corporation, Armonk, NY (US)

(*) Notice: Subject to any disclaimer, the term of this patent is extended or adjusted under 35 U.S.C. 154(b) by 512 days.

(21) Appl. No.: 09/671,069

(22) Filed: Sep. 28, 2000

(51) Int. Cl.[7] ............................................... G09G 5/00
(52) U.S. Cl. ...................... 345/705; 345/745; 345/760
(58) Field of Search .............................. 345/705–715, 345/744–747, 760, 762; 715/501.1, 513

(56) References Cited

U.S. PATENT DOCUMENTS

| | | | |
|---|---|---|---|
| 5,157,768 A | | 10/1992 | Hoeber et al. |
| 5,239,617 A | | 8/1993 | Gardner et al. |
| 5,535,321 A | * | 7/1996 | Massaro et al. ............. 345/707 |
| 5,535,323 A | | 7/1996 | Miller et al. |
| 5,563,805 A | | 10/1996 | Arbuckle et al. |
| 5,715,415 A | | 2/1998 | Dazey et al. |
| 5,870,768 A | * | 2/1999 | Hekmatpour ............ 715/501.1 |
| 5,923,325 A | | 7/1999 | Barber et al. |
| 6,003,063 A | | 12/1999 | Wiley |
| 6,021,403 A | | 2/2000 | Horvitz et al. |
| 6,405,192 B1 | * | 6/2002 | Brown et al. ................. 707/3 |
| 6,476,833 B1 | * | 11/2002 | Moshfeghi ................ 345/854 |
| 6,483,523 B1 | * | 11/2002 | Feng .......................... 345/745 |
| 6,486,892 B1 | * | 11/2002 | Stern ......................... 345/760 |
| 6,513,111 B2 | * | 1/2003 | Klimczak et al. ............. 713/1 |

OTHER PUBLICATIONS

Screendumps (Microsoft Internet Explorer 5.0, 1999; pp. 1–3).*
IBM Technical Disclosure Bulletin, *Interactive Sprite Agent for Contextual Help*, vol. 38, No. 10, Oct. 1995, pp. 415–416.

* cited by examiner

Primary Examiner—Sy D. Luu
(74) Attorney, Agent, or Firm—Duke W. Yee; Jeffrey S. LaBaw; Wayne P. Bailey

(57) ABSTRACT

A method and apparatus in a data processing system for generating a user guide for an application in which application features are customizable through user input. Application features are identified from a profile for currently available application features. A set of documents is located providing user guide information for the currently available application features. A document is generated containing links to the set of documents. Further, the document may include graphical representations of icons or menu entries associated with application features through the user input.

29 Claims, 6 Drawing Sheets

METHOD AND APPARATUS FOR PROVIDING ON LINE HELP FOR CUSTOM APPLICATION INTERFACES

BACKGROUND OF THE INVENTION

1. Technical Field

The present invention relates generally to an improved data processing system and in particular, to a method and apparatus for providing a user interface in a data processing system. Still more particularly, the present invention provides a method and apparatus for providing information to a user for understanding a user interface in a data processing system.

2. Description of Related Art

An important characteristic of modern computing systems is the interface between a user and the computer. Early interactive interfaces were text based wherein a user communicated with the computer by typing a sequence of characters on a keyboard and the computer communicated with the user by displaying characters on an output device—commonly a display screen. These input characters specified a command to the computer's operating system or to an application program executing on the computer. This command is invoked program logic to perform a given operation. Modern computer systems use a graphical user interface (GUI) to simplify the interaction between a user and a computer. A GUI equipped computer communicates with a user by displaying graphics, including text and icons, on a display screen and the user communicates with the machine both by typing in textual information in response to dialogs and by manipulating the displayed icons with a pointing device, such as a mouse.

Many modern GUIs provide a window environment. In a typical window environment, the graphical display portrayed on the display screen is arranged to resemble the surface of an electronic "desktop" and each application program running on the computer is represented as one or more electronic "paper sheets" displayed as rectangular regions on the display screen. These rectangular regions are called "windows". Each window may include a multitude of panes. Each pane being an area for a particular type of information (textual, still image, moving image, etc.).

Each window displays information generated by an associated application or system program. Further, several windows may be simultaneously present on the desktop with each containing information generated by a program. A program presents information to the user through each window by drawing or "painting" images, graphics or text within the window. The user also can move a window to a different location on the display screen and change its size and appearance to arrange the desktop in a convenient manner. The user communicates with the program by "pointing at" objects displayed in the window with a cursor controlled by a pointing device and manipulating, e.g. clicking, dragging, and dropping, the objects as desired. In some cases, the program requests additional information from the user in response to a manipulation. This request is presented as a "dialog" that allows the user to provide the requested information to the dialog from the keyboard.

In this type of graphical user interface, applications often allow for users to define or alter the interface to the applications. For example, an application interface for a word processing program may include application features, such as buttons on a tool bar for functions or drop down menus for functions accessible by the user. These functions include, for example, print, copy, cut, new document, save file, and font type. Typically, an application will provide a standard application interface, which may be customizable by a user. Many of these applications allow a user to add or remove application features from a tool bar or drop down menu in the application.

For example, some applications provide the ability to define an interface for a user or a group of users based on a business rule. As a result, the application interface for each group of users is likely to be different. For example, an asset administrator using this product has an application interface, the tool bar and menu bar, containing only asset related application functions. A problem analyst does not require asset related functions and only needs an application interface that contains functions related to tracking and solving user reported problems.

User guides are generally provided with applications so that users are able to quickly obtain information about different application features. User guides for these applications are only provided in soft copy only. Hard copy user guides are no longer present. In many cases, all user information is converted from hard copy documentation to HTML form in newer-releases of applications. Currently, user guides contain information for all application features regardless of whether those features are currently being used by a particular user. As a result, a user is required to browse through the user guide to find information for application features that are currently enabled or selected for use. The problem is further compounded because a hard copy user guide for the user to browse through is no longer available. If the user does not know how to reach a particular interface for a feature in the soft copy, then no way is present for the user to access the on-line help. For example, much of the on-line help is accessed from the dialog by pressing the F1 key. That means that without this invention, the user may not know how to get to the dialog to invoke the on-line help.

Therefore, it would be advantageous to have an improved method and apparatus for creating user guide documentation to summarize application functions available to a particular user or group of users.

SUMMARY OF THE INVENTION

The present invention provides a method and apparatus in a data processing system for generating a user guide for an application in which application features are customizable through user input. Application features are identified from a profile for currently available application features. A set of documents is located providing user guide information for the currently available application features. A document is generated containing links to the set of documents. Further, the document may include graphical representations of icons or menu entries associated with application features through the user input.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
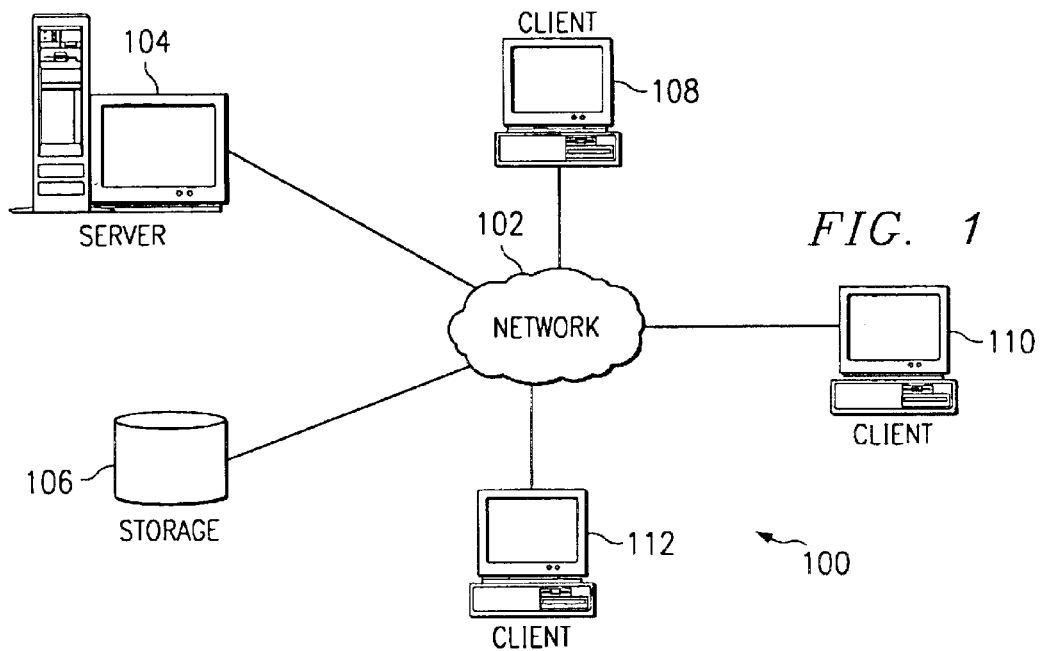
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Applications containing application interfaces may reside on clients 108–112. Alternatively, the applications may be stored and executed on server 104 for clients 108–112. The mechanism of the present invention provides a customizable user guide for users of applications on clients 108–112. In these examples, these user guides are generated on clients 108–112. The client makes a direct connection to the database server to get the profile information. These user guides are custom generated for each user at a client. A user guide for a user will contain only information about application features currently enabled or selected for use by the user. For example, if the user only has application features for cut, paste, and copy functions, then only information for these functions will be found in the user guide for that user. Distributed data processing system 100 may include additional servers, clients, and other devices not shown.

In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
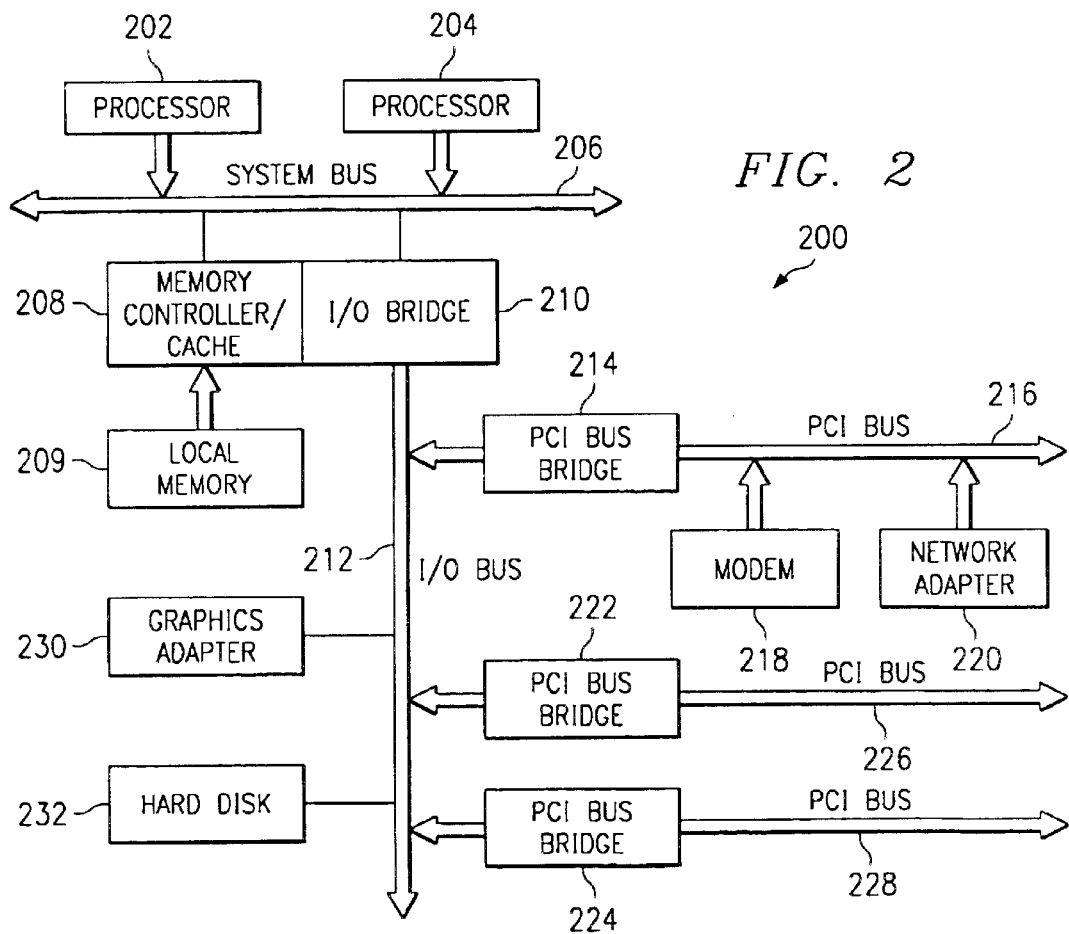
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as-optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
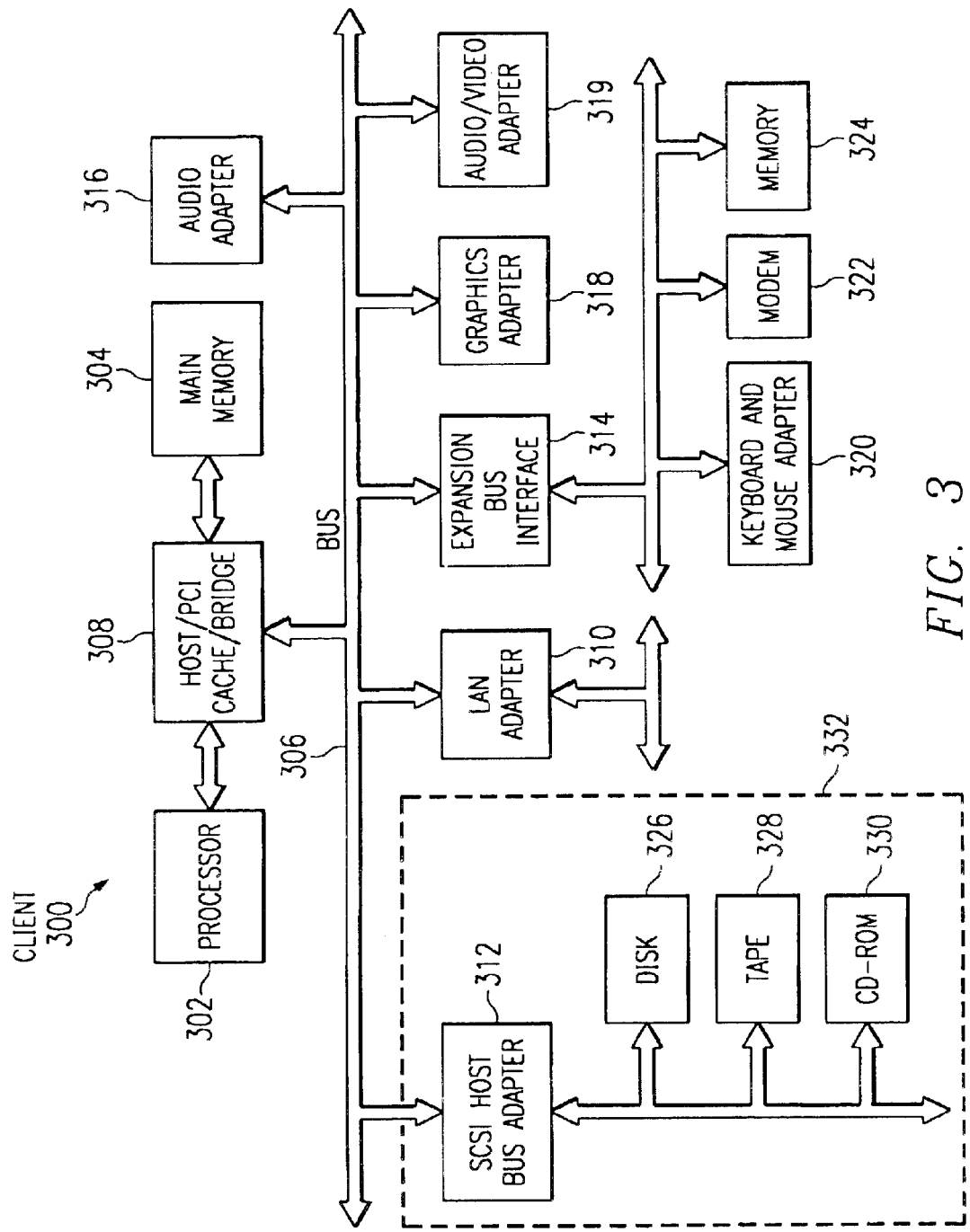
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
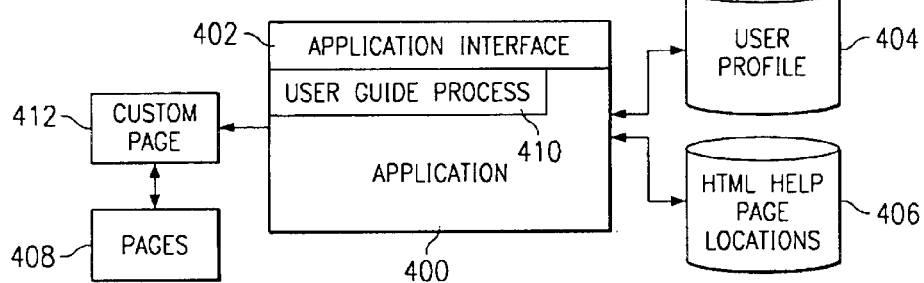
FIG. 4 is a block diagram illustrating components used in generating a custom user guide in accordance with a preferred embodiment of the present invention.

Turning next to FIG. 4, a block diagram illustrating components used in generating a custom user guide is depicted in accordance with a preferred embodiment of the present invention.

In this example, application 400 is an application containing application interface 402, which is customizable on a per user basis. Application interface 402 may contain both drop down menus and tool bars. The particular application features made available on application interface 402 for a user is stored in user profile 404. Thus, when a user changes application features in application interface 402, these changes are stored in user profile 404 in association with that user. HTML help page locations 406 is a collection of pointers or universal resource locators (URLs) to pages 408. Pages 408 in these examples-contain information about all application features for application 400.

Application 400 employs user guide process 410 to generate custom page 412. Custom page 412 contains brief descriptions and links to selected pages in pages 408. These pages are typically located in a document database. These links are to pages describing application features in application interface 402 for the current user of application 400. Each application feature may contain a series of pages arranged in a hierarchical manner. The links contained in custom page 412 may only be for the top level or base page for an application feature. Other pages may be reached through this referenced top level or base page.

User guide process 410 identifies application features for the current user using information located in user profile 404. In addition to identifying application features that are currently used in application interface 402, user guide process 410 also identifies customizations made by the user, such as a particular icon used on application interface 402 for a particular application feature. These identified customizations may be used in presenting information about application features within custom page 412. For example, the icon selected by user for an application feature may be displayed in custom page 410 to allow a user to more easily identify information about that particular feature.

Pages 408 may be located on a client or a server. If pages 408 are located on a server, selection of a link from custom page 412 will result in a page from pages 408 being sent to the user at the client. Additionally, user profile 404 and HTML help page locations 406 may be located on either the server or a client.

Figure 5:
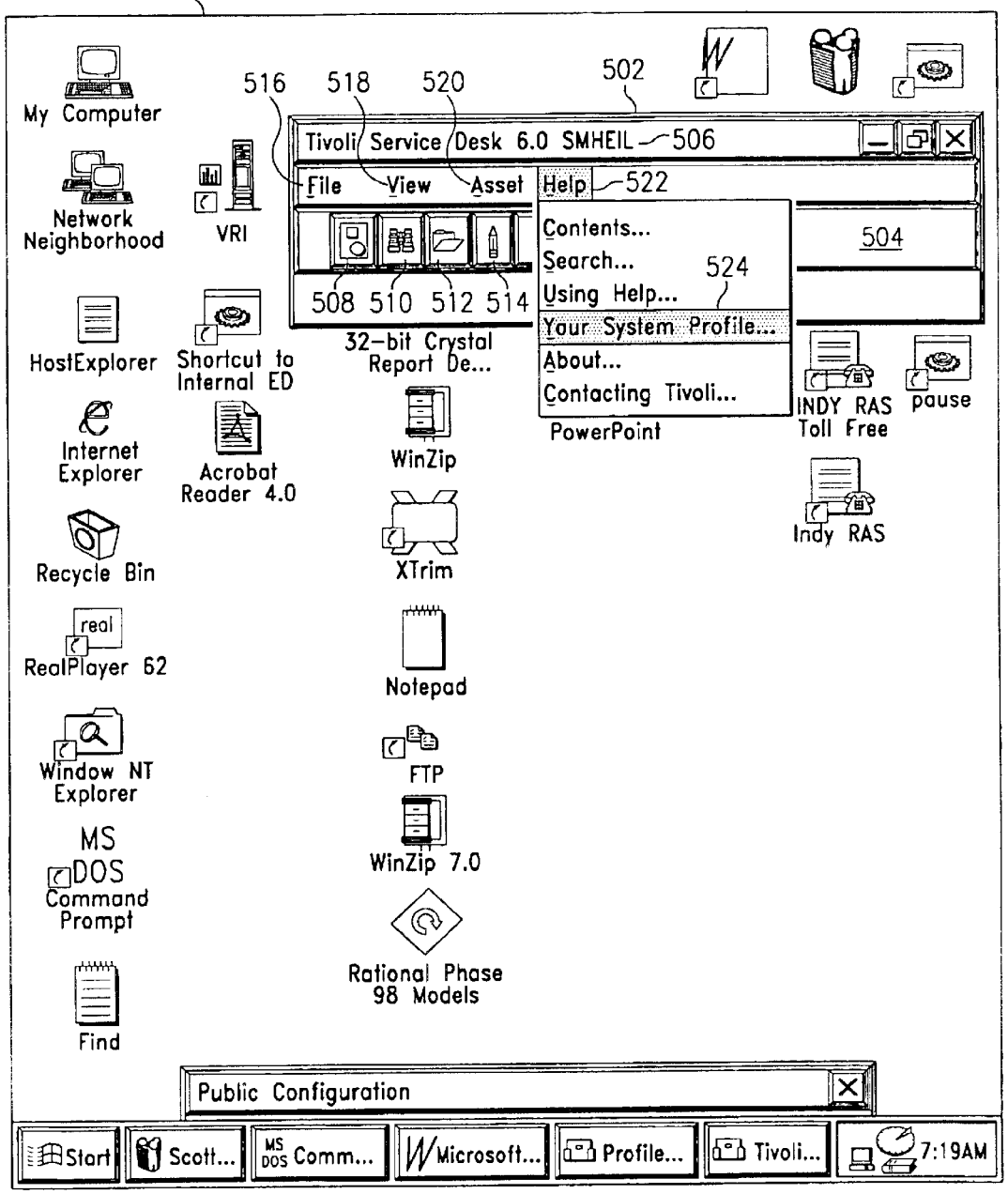
FIG. 5 is a diagram illustrating an application on a desktop in accordance with a preferred embodiment of the present invention.

Turning next to FIG. 5, a diagram illustrating an application on a desktop is depicted in accordance with a preferred embodiment of the present invention.

In this example, desktop 500 includes an application 502 containing tool bar 504 and drop down menu 506, which make up the application interface for application 502. Tool bar 504 contains iconic representations of buttons, such as buttons 508–514 for various application features currently available for use in application 502. In this example, drop down menu 506 contains menus for file 516, view 518, asset 520, and help 522. Help 522 is a menu containing an entry, your system profile 524. Selection of this entry your system profile 524 results in the generation of a custom user guide.

Figure 6:
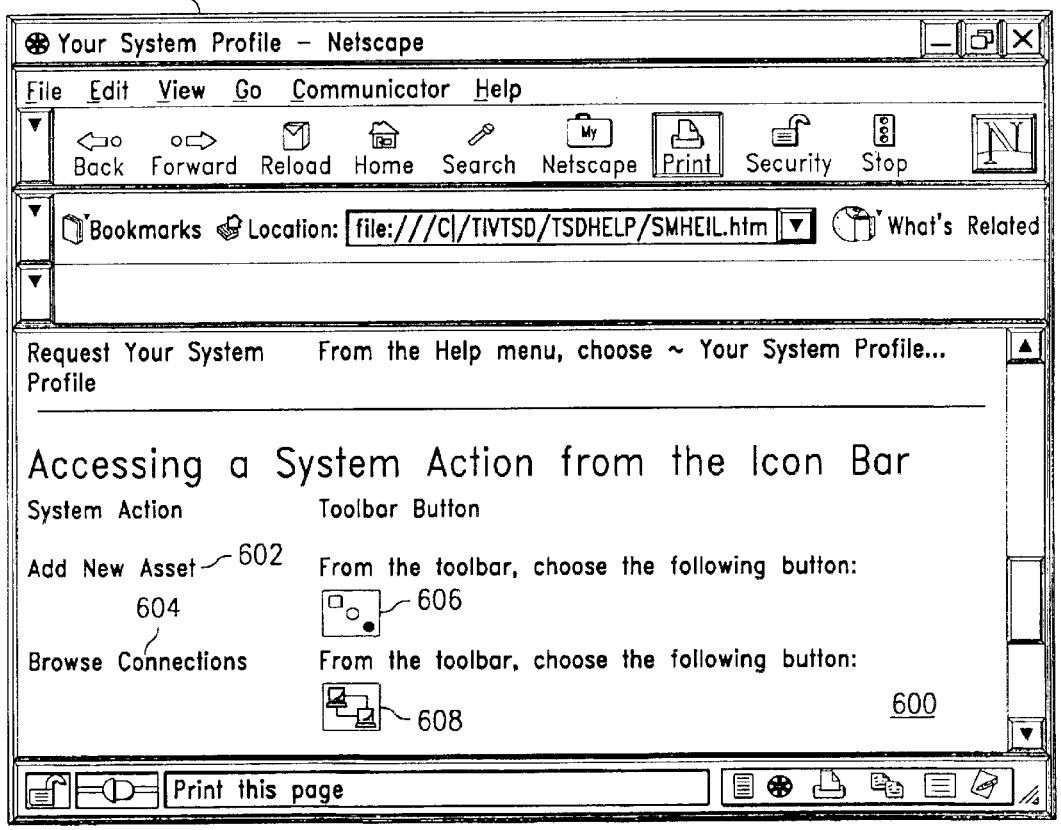
FIG. 6 is a diagram illustrating a custom user guide in accordance with a preferred embodiment of the present invention.

Turning next to FIG. 6, a diagram illustrating a custom user guide is depicted in accordance with a preferred embodiment of the present invention.

Custom user guide 600 is displayed as a hypertext markup language (HTML) web page within browser 602. Custom user guide 600 is an example of a custom user guide generated in response to a user request for a guide on application features. The content of custom user guide 600 is based on profile information for a current user of the application. In this example, add new asset 602 and browse connections 604 are application features present in the application interface from which custom user guide 600 is generated. Additionally, icon 606 and icon 608 are graphical representations of the button in the application interface used to activate the functions add new asset 602 and browse connections 604, respectively. In this example, custom user guide 600 may contain links to other pages providing additional documentation about these application features. In this example, selection of icon 606 and icon 608 activates the links to additional documentation for the application features associated with each icon. Alternatively, the links may be represented using text and a graphical indicator, such as highlighting or underlining of the text.

Figure 7:
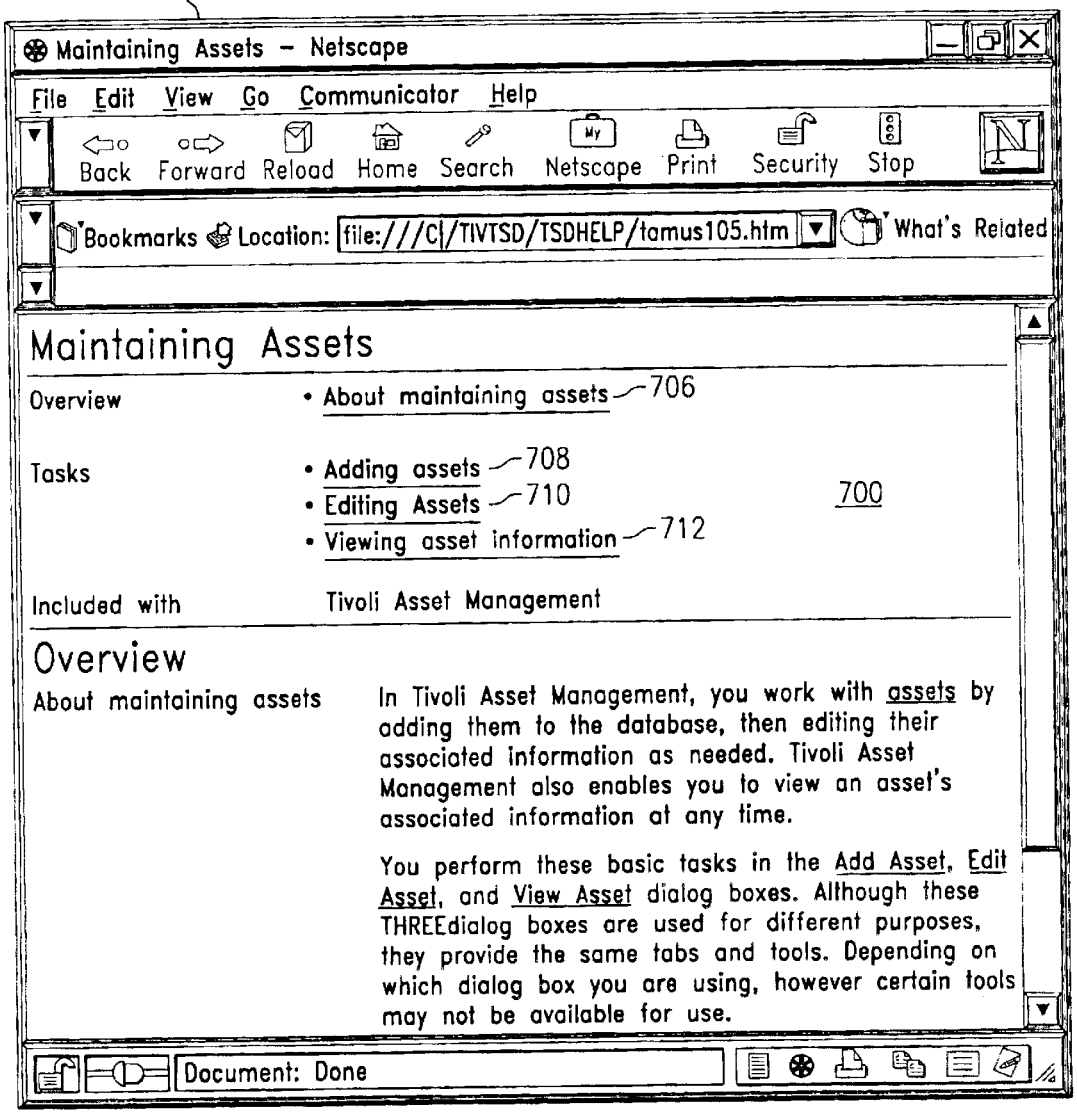
FIG. 7 is a diagram illustrating a custom user guide in accordance with a preferred embodiment of the present invention.

Turning next to FIG. 7, a diagram illustrating a custom user guide is depicted in accordance with a preferred embodiment of the present invention.

In this example, custom user guide 700 is an HTML web page displayed in browser 702. In this example, maintaining assets 706 is an application feature present in the application interface. In this example, links to additional information take the form of text as shown by links 708–712.

In this manner, the custom user guides illustrated in FIGS. 6 and 7 allow a user to know exactly what application features are presently available. Further, the custom user guide also provides a single location or document from which to obtain additional help or information about these features.

Figure 8:
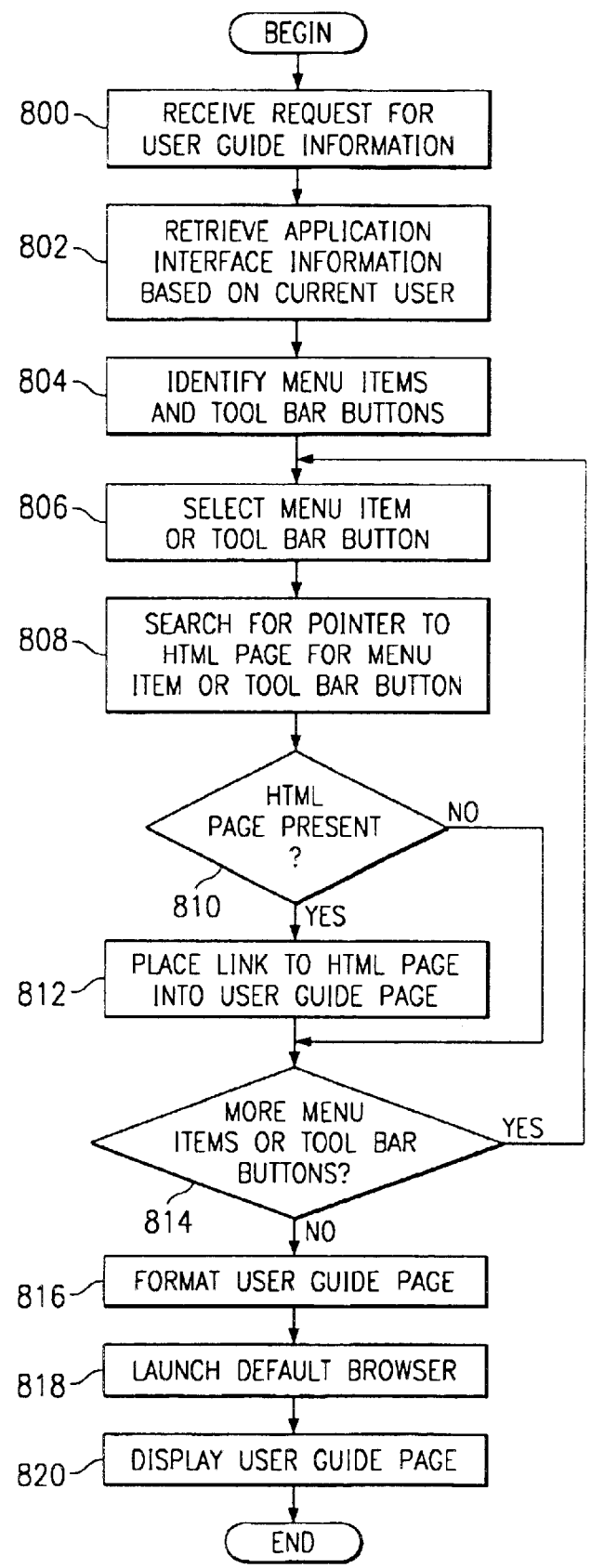
FIG. 8 is a flowchart of a process used for generating a custom user guide in accordance with a preferred embodiment of the present invention.

Turning next to FIG. 8, a flowchart of a process used for generating a custom user guide is depicted in accordance with a preferred embodiment of the present invention.

The process begins by receiving a request for user guide information (step 800). In this example, the request may be received through a user selecting your system profile 524 in application interface 506 in FIG. 5. Next, application interface information is retrieved based on the current user (step 802). In this example, the application interface information may be found in a database, such as user profile 404 in FIG. 4. This information contains an identification of application features currently selected for use in the application interface for the particular user. Additionally, other information, such as, for example, icons selected for buttons or text selected for menu items may be retrieved.

Menu items and tool bar buttons are identified using the application interface information (step 804). Then, a menu item or tool bar button is selected (step 806). Step 806 is used to select an unprocessed menu item or tool bar. A search is made for a pointer to HTML page for the menu item or tool bar button (step 808). The pointer may be, for example, a URL or a file path. A, determination is then made as to whether an HTML page is present (step 810). If an HTML page is present, a link to the HTML page is placed into the user guide page (step 812).

Next, a determination is made as to whether there are more menu items or tool bar buttons (step 814). Step 814 determines whether all of the identified menu items and tool bar buttons have been processed. If there are not more menu items or tool bar buttons, the user guide page is formatted (step 816). The default browser is launched (step 818). Then, the user guide page is displayed (step 820) with the process terminating thereafter.

With reference again to step 810, if an HTML page is not present, the process proceeds to step 814.

With reference again to step 814, if there are more menu items or tool bar buttons, the process returns to step 806.

Thus, the present invention provides a method, apparatus, and computer implemented instructions for generating a user guide which reflects currently available application features in an application interface. In this manner, a custom user guide can be generated for different users or different groups of users in which application features vary. This custom user guide provides a single location from which help or more information may be obtained for applications features. Additionally, this user guide allows users to quickly identify available features in the application interface.

The mechanisms of the present invention described above are used at runtime. In this manner, customizations made by a user to the interface may be taken into account in the user guide. This use of the present invention is especially advantageous because it is difficult and impossible to predict what customizations a user might make. For example, a user might select to use a custom bitmap for a button and associate a custom name, such as "Bob", with this button. In this case, the user cannot search for the help information based on the customized name in a user guide created prior to runtime and customization of the application interface.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the processes used to generate a user guide are illustrated as being initiated in response to a user request. These processes may be initiated in other ways. For example, a user guide may be generated each time a user makes a change to an application interface. Further, other document types other than HTML web pages may be used in generating user guides. For example, extensible markup language (XML) pages may be used. In addition, markup language need not be used for these documents. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for generating a user guide for an application having a plurality of currently available application features, the method comprising the computer implemented steps of:

changing, by a user, at least one application feature currently available for the application;

receiving a request from the user for the user guide;

locating a set of documents providing user guide information for the currently available application features; and generating a document containing links to the set of documents, wherein the document is the user guide and provides user guide information for the currently available application features as changed by the user.

2. The method of claim 1 further comprising:

presenting the document on the data processing system.

3. The method of claim 1, wherein the request is received from a remote data processing system and further comprising:

sending the document to the remote data processing system.

4. The method of claim 1, wherein the step of generating includes:

placing a graphical representation of each of the currently available application features in association with the links.

5. The method of claim 4, wherein a given link of the links is activated in response to a selection of a graphical representation of a currently available application feature.

6. The method of claim 1, wherein the document is a web page.

7. The method of claim 6, wherein the web page is a hypertext markup language document.

8. A method of claim 1, wherein the receiving, locating, and generating steps are executed at runtime for the application.

9. A method in a data processing system for generating a customized user guide for an application, the method comprising the computer implemented steps of:

changing, by a user, at least one application interface feature currently available for the application;

receiving a request from the user for the customized user guide;

generating a page containing links to a plurality of pages associated with application interface features currently available for the application; and displaying the page on the data processing system, wherein selection of a link for a specific application interface feature from the currently available application interface features links retrieves a page for the specific application interface feature.

10. The method of claim 9, wherein the page is a hypertext markup language document.

11. The method of claim 9, wherein the receiving, generating, and displaying steps are executed at runtime for the application.

12. A data processing system comprising:

a bus system;

a communications unit connected to the bus system;

a memory connected to the bus system, wherein the memory includes as set of instructions; and a processing unit connected to the bus system, wherein the processing unit executes the set of instructions to change, responsive to input by a user, at least one application feature currently available for an application, receive a request from the user for a user guide, locate a set of documents providing user guide information for the currently available application features, and generate a document containing links to the set of documents, wherein the document is the user guide and provides user guide information for the currently available application features as changed by the user.

13. The data processing system of claim 12, wherein the bus system is a single bus.

14. The data processing system of claim 12, wherein the bus system includes a primary bus and a secondary bus.

15. The data processing system of claim 12, wherein the processing unit includes a plurality of processors.

16. The data processing system of claim 12, wherein the communications unit is one of a modem and Ethernet adapter.

17. A data processing system for generating a user guide for an application having a plurality of currently available application features, the data processing system comprising:

changing means for changing, by a user, at least one application feature currently available for the application;

receiving means for receiving a request from the user for the user guide;

locating means for locating a set of documents providing user glide information for the currently available application features; and generating means for generating a document containing links to the set of documents, wherein the document is the user guide and provides user guide information for the currently available application features as changed by the user.

18. The data processing system of claim 17, further comprising:

presenting means for presenting the document on the data processing system.

19. The data processing system of claim 17, wherein the request is received from a remote data processing system and further comprising:

sending means for sending the document to the remote data processing system.

20. The data processing system of claim 17, wherein the generating means includes:

placing means for placing a graphical representation of each of the currently available application features in association with the links.

21. The data processing system of claim 20, wherein a given link of the links is activated in response to a selection of a graphical representation of a currently available application feature.

22. The data processing system of claim 17, wherein the document is a web page.

23. The data processing system of claim 22, wherein the web page is a hypertext markup language document.

24. A data processing system of claim 17, wherein the receiving means, locating means, and generating means are executed at runtime for the application.

25. A data processing system for generating a customized user guide for an application, the data processing system comprising:

changing means for changing, by a user, at least one application interface feature currently available for the application;

receiving means for receiving a request from the user for the customized user guide;

generating means for generating a page containing links to a plurality of pages associated with application interface features currently available for the application; and displaying means for displaying the page on the data processing system, wherein selection of a link for a specific application interface feature from the currently available application interface features links retrieves a page for the specific application interface feature.

26. The data processing system of claim 25, wherein the page is a hypertext markup language document.

27. The data processing system of claim 25, wherein the receiving means, generating means, and displaying means are executed at runtime for the application.

28. A computer program product in a computer readable medium for use in a data processing system for generating a user guide for an application having a plurality of currently available application features the computer program product comprising:

first instructions for changing, responsive to input by a user, at least one application feature currently available for the application;

second instructions for receiving a request from the user for the user guide;

third instructions for locating a set of documents providing user guide information for the currently available application features; and fourth instructions for generating a document containing links to the set of documents, wherein the document is the user guide and provides user guide information for the currently available application features as changed responsive to the input by the user.

29. A computer program product in a computer readable medium for use in a data processing system for generating a customized user guide for an application, the computer program product comprising:

first instructions for changing, responsive to input by a user, at least one application interface feature currently available for the application;

second instructions for receiving a request from the user for the customized user guide;

third instructions for generating a page containing links to a plurality of pages associated with application interface features currently available for the application; and fourth instructions for displaying the page on the data processing system, wherein selection of a link for a specific application interface feature from the currently available application interface features links retrieves a page for the specific application interface feature.

* * * * *

UNITED STATES PATENT AND TRADEMARK OFFICE
CERTIFICATE OF CORRECTION

PATENT NO. : 6,788,313 B1
DATED : September 7, 2004
INVENTOR(S) : Heil

It is certified that error appears in the above-identified patent and that said Letters Patent is hereby corrected as shown below:

Column 10,
Line 7, after "user" delete "glide" and insert -- guide --.

Signed and Sealed this

Twenty-seventh Day of December, 2005

JON W. DUDAS
*Director of the United States Patent and Trademark Office*